US012771973B2

(12) United States Patent
Umeda et al.

(10) Patent No.: US 12,771,973 B2
(45) Date of Patent: Oct. 20, 2026

(54) CONTROL APPARATUS, COMMUNICATION SYSTEM, CONTROL METHOD AND PROGRAM

(71) Applicant: NTT, Inc., Tokyo (JP)

(72) Inventors: Karin Umeda, Musashino (JP); Kota Asaka, Musashino (JP); Hiroko Nomura, Musashino (JP); Hiroshi O, Musashino (JP); Yoshihito Sakai, Musashino (JP); Hirotaka Ujikawa, Musashino (JP); Kenji Miyamoto, Musashino (JP); Yuka Okamoto, Musashino (JP); Tatsuya Shimada, Musashino (JP)

(73) Assignee: NTT, Inc., Tokyo (JP)

( * ) Notice: Subject to any disclaimer, the term of this patent is extended or adjusted under 35 U.S.C. 154(b) by 266 days.

(21) Appl. No.: 18/694,813

(22) PCT Filed: Oct. 4, 2021

(86) PCT No.: PCT/JP2021/036679

§ 371 (c)(1),
(2) Date: Mar. 22, 2024

(87) PCT Pub. No.: WO2023/058096

PCT Pub. Date: Apr. 13, 2023

(65) Prior Publication Data

US 2024/0323575 A1 Sep. 26, 2024

(51) Int. Cl.

*H04B 10/00* (2013.01)
*H04B 10/27* (2013.01)
*H04Q 11/00* (2006.01)

(52) U.S. Cl.

CPC ......... *H04Q 11/0062* (2013.01); *H04B 10/27* (2013.01); *H04Q 2011/0086* (2013.01)

(58) Field of Classification Search

CPC .............. H04B 10/27; H04B 10/25753; H04B 10/25752; H04B 10/40; H04Q 11/0062;

(Continued)

(56) References Cited

U.S. PATENT DOCUMENTS 8,649,341 B2 * 2/2014 Guey .................... H04W 28/16 370/329
2002/0005968 A1 1/2002 Suzuki (Continued)

FOREIGN PATENT DOCUMENTS

JP H09266462 A 10/1997
JP 2002-027514 A 1/2002

(Continued)

OTHER PUBLICATIONS

ITU-T Recommendation G.989.3, "40-Gigabit-capable passive optical networks (NG-PON2): Transmission convergence layer specification", (2020).

(Continued)

*Primary Examiner* — Hanh Phan

(57) ABSTRACT

A control device including a collection unit that acquires, at a predetermined cycle, cooperation information, which is information indicating a communication state between a communication system that includes a wireless station including an antenna and an allocation device that allocates a wavelength, and a terminal to be communicated, an analysis unit that analyzes the communication state in the communication system on the basis of the cooperation information, and an allocation control unit that controls execution of wavelength allocation by the allocation device on the basis of an analysis result of the analysis unit.

7 Claims, 12 Drawing Sheets

(58) Field of Classification Search
CPC .............. H04Q 11/0067; H04J 14/0256; H04J 14/0227; H04J 14/0249; H04J 14/0245; H04W 16/28; H04W 24/02
USPC ...... 398/66, 67, 68, 69, 70, 71, 72, 79, 135, 398/136, 158, 159, 33, 38, 25, 26, 27, 45, 398/48, 49, 115; 370/328, 329, 330, 436, 370/431
See application file for complete search history.

(56) References Cited

U.S. PATENT DOCUMENTS

| | | | | |
|---|---|---|---|---|
| 2012/0170508 | A1 | 7/2012 | Sawai | |
| 2019/0372698 | A1* | 12/2019 | Hisano .................... | H04L 12/44 |

FOREIGN PATENT DOCUMENTS

| | | | |
|---|---|---|---|
| JP | 2011-091783 | A | 5/2011 |
| JP | 2013-055528 | A | 3/2013 |
| JP | 2013-176136 | A | 9/2013 |
| JP | 2020-136961 | A | 8/2020 |
| WO | WO-2018/062281 | A1 | 4/2018 |

OTHER PUBLICATIONS

Kyosuke Sone, Goji Nakagawa, Yoshio Hirose, and Takeshi Hoshida, (Fujitsu Limited), "Demonstration of Remote Management and Control in WDM-PON System for 5G Mobile Fronthaul", IEICE Technical Report, pp. 5-10, Jan. 2020.
"How a monitoring interval is determined??", SecuAvail News vol. 2, 2014 [online], [retrieved on Sep. 21, 2021], Internet<URL:https://www.secuavail.com/SANEWS/vol02/sanews05.html>.
"Systemwalker Centric Manager user's guide monitoring function section—UNIX(registered trademark) / Windows (registered trade-mark) (R) common—", [online], [retrieved on Sep. 21, 2021], Internet <URL:https://software.fujitsu.com/jp/manual/manualfiles/M070125/J2X13120/05Z200/moni05/moni0126.html>.
J. D. Case et al., "A Simple Network Management Protocol (SNMP)", 1989, [online], [retrieved on Sep. 21, 2021], Internet<URL:https://datatracker.ietf.org/doc/html/rfc1098>.
D. Levi et al., "Simple Network Management Protocol (SNMP) Applications", 2002, [online], [retrieved on Sep. 21, 2021], Internet <URL:https://datatracker.ietf.org/doc/html/rfc3413>.
Presuhn, "Version 2 of the Protocol Operations for the Simple Network Management Protocol (SNMP)", 2002, [online], [retrieved on Sep. 21, 2021], Internet<URL:https://datatracker.ietf.org/doc/html/rfc3416>.

* cited by examiner

CONTROL APPARATUS, COMMUNICATION SYSTEM, CONTROL METHOD AND PROGRAM

CROSS-REFERENCE TO RELATED APPLICATIONS

This application is a 371 U.S. National Phase of International Application No. PCT/JP2021/036679, filed on Oct. 4, 2021. The entire disclosure of the above application is incorporated herein by reference.

TECHNICAL FIELD

The present invention relates to a control apparatus, a communication system, a control method, and a program.

BACKGROUND ART

There is a technique for detecting a failure or an error of a network device, which is a device constituting an optical communication system such as an AMCC (Auxiliary Management and Control Channel) or an SNMP (Simple Network Management Protocol), and instructing allocation to a spare wavelength or allocation of the network device when the failure or the error occurs. In such a technique, information on an occurrence of the failure or the error of the network device is acquired, and allocation to the spare wavelength or instructing allocation of the network device is performed. An interval for monitoring is defined as a minute unit.

CITATION LIST

Non Patent Literature

[NPL 1] ITU-T Recommendation G.989.3, "40-Gigabit-capable passive optical networks (NG-PON2): Transmission convergence layer specification" (2020).

[NPL 2] Kyosuke SONE, Goji NAKAGAWA, Yoshio HIROSE, and Takeshi HOSHIDA (Fujitsu Limited) "Demonstration of Remote Management and Control in WDM-PON System for 5G Mobile Fronthaul", IEICE Technical Report, pp. 5-10, January 2020

[NPL 3] "How a monitoring interval is determined??", SecuAvail NEWS Vol. 2, [online], [retrieved on Sep. 21, 2021], Internet <URL: https://www.secuavail.com/SANEWS/vol02/sanews05.html>

[NPL 4] "Systemwalker Centric Manager user's guide monitoring function section-UNIX (registered trademark)/Windows (registered trademark) (R) common-", [online], [retrieved on Sep. 21, 2021], Internet <URL: https://software.fujitsu.com/jp/manual/manualfiles/M07012 5/J2X13120/05Z200/moni05/moni0126.html>

[NPL 5] "A Simple Network Management Protocol (SNMP)", [online], [retrieved on Sep. 21, 2021], Internet <URL: https://datatracker.ietf.org/doc/html/rfc1098>

[NPL 6] "Simple Network Management Protocol (SNMP) Applications", [online], [retrieved on Sep. 21, 2021], Internet <URL: https://datatracker.ietf.org/doc/html/rfc3413>

[NPL 7] "Version 2 of the Protocol Operations for the Simple Network Management Protocol (SNMP)", [online], [retrieved on Sep. 21, 2021], Internet <URL: https://datatracker.ietf.org/doc/html/rfc3416>

SUMMARY OF INVENTION

Technical Problem

However, when traffic fluctuation occurs due to an unexpected event such as a disaster or a delay of a train, the AMCC and SNMP cannot acquire information on the unexpected traffic fluctuation, and cannot perform band control by real-time wavelength reallocation. As a result, a communication error may occur, such as an occurrence of conflict due to a network congestion.

In view of the above circumstances, an object of the present invention is to provide a technique for suppressing a frequency of communication error occurrence.

Solution to Problem

One aspect of the present invention is a control device including a collection unit that acquires, at a predetermined cycle, cooperation information, which is information indicating a communication state between a communication system that includes a wireless station including an antenna and an allocation device that allocates a wavelength, and a terminal to be communicated, an analysis unit that analyzes the communication state in the communication system on the basis of the cooperation information, and an allocation control unit that controls execution of wavelength allocation by the allocation device on the basis of an analysis result of the analysis unit.

One aspect of the present invention is a communication system comprising: a wireless station including an antenna, an allocation device that allocates a wavelength, a collection unit configured to acquire, at a predetermined cycle, cooperation information, which is information indicating a communication state between the system per se and a terminal to be communicated; an analysis unit configured to analyze the communication state in the system on the basis of the cooperation information; and an allocation control unit configured to control execution of wavelength allocation by the allocation device on the basis of an analysis result of the analysis unit.

One aspect of the present invention is a control method including a collection step of acquiring, at a predetermined cycle, cooperation information, which is information indicating a communication state between a communication system that includes a wireless station including an antenna and an allocation device that allocates a wavelength, and a terminal to be communicated, an analysis step of analyzing the communication state in the communication system on the basis of the cooperation information, and an allocation control step of controlling execution of wavelength allocation by the allocation device on the basis of an analysis result of the analysis unit.

One aspect of the present invention is a program for causing a computer to function as the above-mentioned control device.

Advantageous Effects of Invention

According to the present invention, the frequency of communication error occurrence can be suppressed.

DESCRIPTION OF EMBODIMENTS

Embodiment

Figure 1:
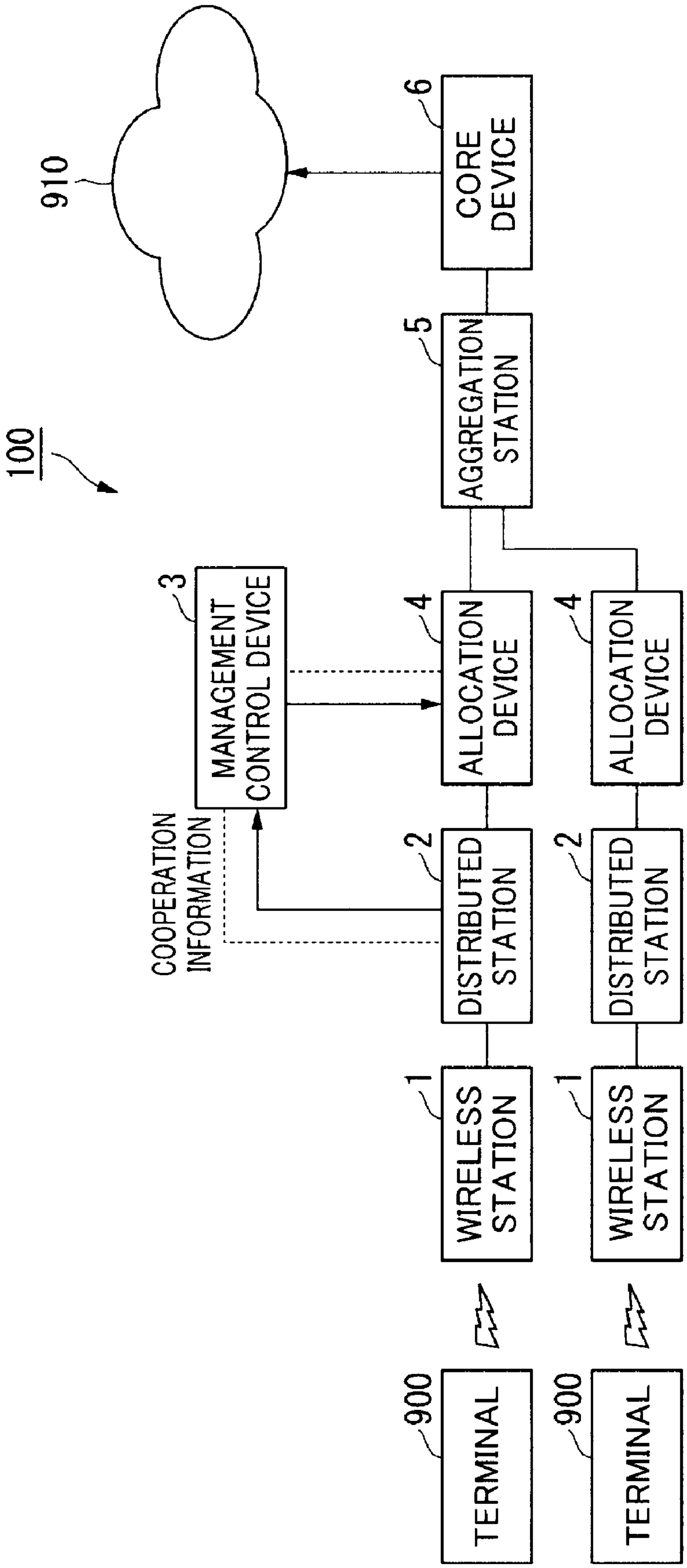
FIG. 1 is a diagram showing a configuration example of a communication system according to an embodiment.

FIG. 1 is a diagram showing a configuration example of a communication system 100 according to an embodiment. The communication system 100 is a system for performing communication using optical signals. The communication system 100 acquires signals of terminals 900 to be communicated. The terminal 900 is, for example, a mobile wireless terminal such as a smartphone. The communication system 100 transmits the acquired signals to an external network 910.

The communication system 100 includes M wireless stations 1, M distributed stations 2, a management control device 3, M allocation devices 4, an aggregation station 5 and a core device 6. M is an integer equal to or larger than 1. That is, the communication system 100 includes one or a plurality of wireless stations 1, one or a plurality of distributed stations 2, and the same number of allocation devices 4 as the distributed stations 2. The distributed station 2 and the allocation device 4 correspond to each other in one-to-one correspondence.

The wireless station 1 receives the signals transmitted by the terminal 900 and transmits the signals to the terminal 900. Therefore, the wireless station 1 is a device having an antenna. The wireless station 1 is, for example, a RU (Radio Unit) in a 5G communication standard.

The distributed station 2 is connected to the wireless station 1 by an optical fiber. The distributed station 2 receives upstream signals transmitted by the wireless station 1. The distributed station 2 transmits downstream signals to the wireless station 1. Note that the upstream signals are signals transmitted by the terminal 900, and the downstream signals are signals propagating toward the terminal 900. Each distributed station 2 is connected to a plurality of wireless stations 1. That is, the distributed station 2 and the wireless station 1 have a one-to-M correspondence relationship. The distributed station 2 is, for example, a DU (Distributed Unit) in the 5G communication standard. Information acquired by the management control device 3 from the distributed station 2 will be referred to as cooperation information. The cooperation information is information indicating a communication state between the communication system 100 (that is, system per se) and the terminal 900.

The cooperation information includes, for example, an average throughput of the terminals 900. The cooperation information includes, for example, the number of terminals 900 with which the wireless station 1 communicates for each wireless station 1. The cooperation information includes, for example, registration information of the terminal 900. Note that the registration information of the terminal 900 is information indicating a PDU session setting request of the terminal 900. The cooperation information includes, for example, scheduling information including a traffic amount of each terminal 900. Note that the scheduling information is information indicating transmission timing and transmission data amount of user data allocated to each terminal 900 by the distributed station 2.

The management control device 3 acquires the cooperation information from the distributed station 2. The management control device 3 acquires a wavelength allocation notification having a content based on the acquired cooperation information. The wavelength allocation notification is information indicating how wavelength allocation is performed. More specifically, the wavelength allocation notification is information indicating how the wavelength allocation is performed by each allocation device 4. The wavelength allocation may be processing of wavelength switching, processing of newly added wavelength allocation, or processing of reallocating remaining wavelength after a part of wavelengths is deleted. The management control device 3 controls the operation of the allocation device 4 to execute the content of the wavelength allocation notification.

The allocation device 4 performs allocation indicated by the wavelength allocation notification transmitted by the management control device 3. Therefore, the allocation device 4 is a device for allocating wavelength by receiving control of the management control device 3. That is, the management control device 3 is a device for controlling the execution of wavelength allocation. The allocation device 4 notifies the management control device 3 of the completion of the wavelength allocation processing at the timing when the wavelength allocation is completed. Hereinafter, the notification indicating that the wavelength allocation processing has been completed is referred to as an allocation completion notification.

The aggregation station 5 aggregates the upstream signals transmitted by the distributed station 2. The aggregation station 5 distributes the downstream signals. The aggregation station 5 is, for example, a CU (Centralized Unit) in the 5G communication standard.

The core device 6 executes signal processing on the upstream signals aggregated by the aggregation station 5. The core device 6 transmits signals obtained as a result of execution of signal processing on the upstream signals to an external network 910. In addition, the core device 6 receives the signals from the external network 910.

The core device 6 performs preset predetermined signal processing on signals received from the external network 910. The core device 6 transmits signals obtained as a result of execution of signal processing on the signals received from the external network 910 to the aggregation station 5 as the downstream signals. The signal processing is, for example, a transfer of user data in a UPF (User Plane Function) of a 5G core network.

Figure 2:
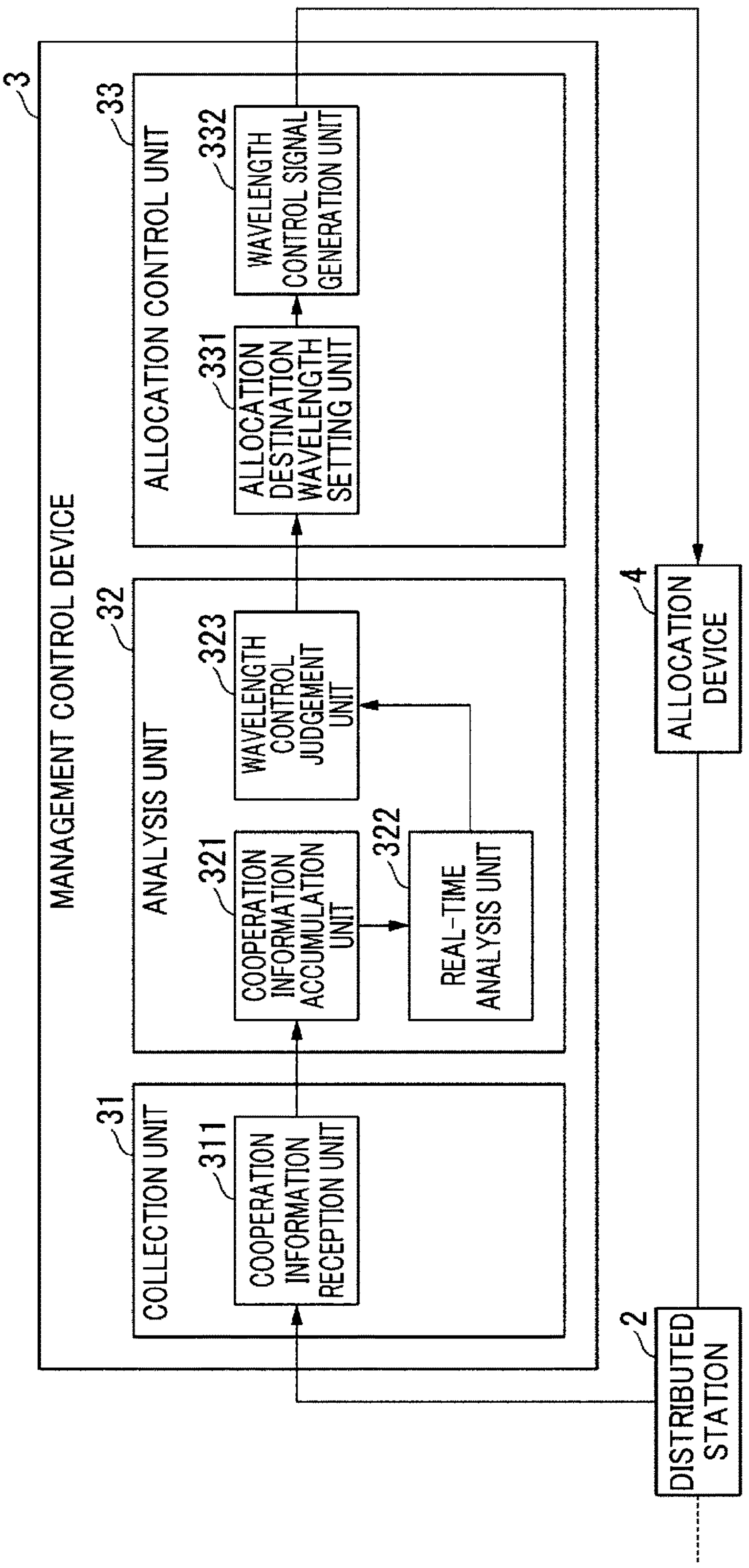
FIG. 2 is a diagram showing an example of a configuration of a management control device according to the embodiment.

FIG. 2 is a diagram showing an example of a configuration of the management control device 3 according to the embodiment. The management control device 3 includes a collection unit 31, an analysis unit 32, and an allocation control unit 33.

The collection unit 31 includes a cooperation information reception unit 311. The cooperation information reception unit 311 acquires the cooperation information from the distributed station 2.

The analysis unit 32 includes a cooperation information accumulation unit 321, a real-time analysis unit 322, and a wavelength control judgement unit 323. The cooperation information accumulation unit 321 records the acquired cooperation information in a predetermined storage device. The predetermined device is, for example, a storage device 302 which will be described later. The real-time analysis unit 322 analyzes the communication state in the communication system 100 for a change amount of the number of connections per band or unit time, and the like on the basis of the cooperation information.

The wavelength control judgement unit 323 judges whether or not to reallocate the wavelength on the basis of the analysis result of the real-time analysis unit 322. For example, the wavelength control judgement unit 323 compares the analysis result of the real-time analysis unit 322 with a predetermined threshold value or a band currently allocated, and judges whether or not to reallocate the wavelength. Reallocation of wavelength means addition or deletion of wavelength. The allocation destination wavelength setting unit 331 may judge a wavelength to be added and a wavelength not used in the allocation, and determine the wavelength of the allocation destination on the basis of the judgement result.

In this way, the analysis unit 32 judges whether or not to allocate the wavelength on the basis of the cooperation information.

The allocation control unit 33 determines how the wavelength allocation is to be performed when the analysis unit 32 determines that the wavelength is to be allocated. Then, the allocation control unit 33 transmits the wavelength allocation notification to control the operation of the allocation device 4 so that the determined content is executed. Specifically, the operation of the allocation device 4 by the allocation control unit 33 is controlled by transmitting control information, which is information indicating the operation executed by the allocation device 4, to the allocation device 4 by the allocation control unit 33.

The allocation control unit 33 includes an allocation destination wavelength setting unit 331, and a wavelength control signal generation unit 332. The allocation destination wavelength setting unit 331 determines a transmission destination of the wavelength allocation notification. The transmission destination is, for example, the allocation device 4. The allocation destination wavelength setting unit 331 may determine the content of wavelength allocation. The allocation destination wavelength setting unit 331 may judge, for example, a wavelength to be added and a wavelength not used in the allocation, and determine the wavelength of the allocation destination on the basis of a judgement result.

The wavelength control signal generation unit 332 generates the wavelength allocation notification, and notifies a predetermined notification destination of the generated wavelength allocation notification. In addition, the wavelength control signal generation unit 332 generates control information on the basis of the content of the wavelength allocation notification and predetermined information indicating the operable content of the allocation device 4. The control information generated in this way is information indicating the operation of the allocation device 4 which realizes the content of the wavelength allocation notification. The wavelength control signal generation unit 332 transmits the generated control information to the allocation device 4.

Thus, the allocation control unit 33 determines the transmission destination of the wavelength allocation notification and controls the allocation device 4 to execute the determined contents by the allocation destination wavelength setting unit 331 and the wavelength control signal generation unit 332. That is, the allocation control unit 33 controls execution of wavelength allocation by the allocation device 4 on the basis of the analysis result of the analysis unit 32.

The determination of the content of the wavelength allocation notification is determined by the allocation destination wavelength setting unit 331.

Figure 3:
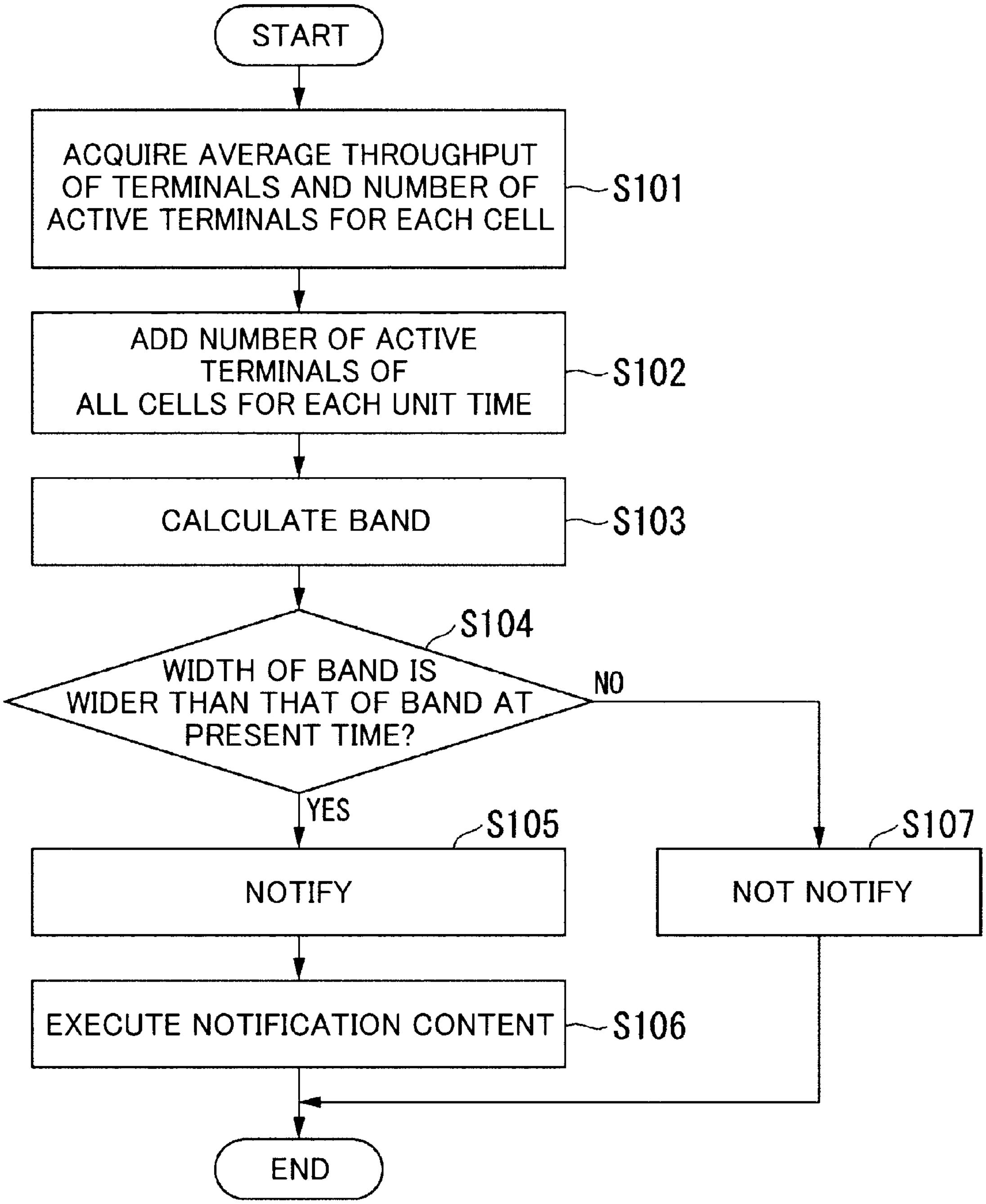
FIG. 3 is a first flowchart showing an example of a flow of processing executed by the management control device according to the embodiment.

FIG. 3 is a first flowchart showing an example of a flow of processing executed by the management control device 3 according to the embodiment. More specifically, FIG. 3 is a flowchart showing an example of a flow of processing executed by the management control device 3, as an example, in a case where the cooperation information indicates an average throughput of the terminals 900 and the number of active terminals 900 for each cell. The flow of the processing shown in FIG. 3 is not executed only when an unexpected event such as an AMCC (Auxiliary Management and Control Channel) or an SNMP (Simple Network Management Protocol) occurs, but is repeatedly executed at a predetermined cycle.

Note that the number of active terminals 900 for each cell is the number of terminals 900 with which each wireless station 1 is communicating for each wireless station 1. Hereinafter, the average throughput of the terminals 900 is referred to as terminal average throughput. Hereinafter, the number of active terminals 900 for each cell is referred to as terminal active number.

The cooperation information reception unit 311 acquires the cooperation information from the distributed station 2 (step S101). Next, the real-time analysis unit 322 adds the number of active terminals 900 of all cells for each unit time on the basis of the terminal active number included in the acquired cooperation information (step S102). Note that the addition of the number of active terminals 900 of all cells for each unit time means the acquisition of the number of terminals 900 with which each distributed station 2 is communicating in each unit time. Hereinafter, the number of terminals 900 with which each distributed station 2 is communicating in each unit time is referred to as all active terminal number.

Next, the real-time analysis unit 322 calculates a band satisfying a predetermined condition (hereinafter referred to as "error frequency occurrence condition") regarding the low frequency of the communication error occurrence on the basis of the terminal average throughput and all active terminal number (step S103). The error frequency occurrence condition is, for example, a condition that the frequency of the communication error occurrence is lower than a preset predetermined frequency. The predetermined frequency is, for example, a condition that the frequency of occurrence per unit time is one or less.

The real-time analysis unit 322 calculates, for example, a product of the terminal average throughput and all active terminal number, and acquires a calculation result as the band satisfying the error frequency occurrence condition. The processing in the step S102 and the step S103 is an analysis of the communication state in the communication system 100 by the real-time analysis unit 322, and an example of analysis based on the cooperation information.

Next, the wavelength control judgement unit 323 judges whether or not width of the band satisfying the error frequency generation condition is wider than the width of allocated band at the present time (step S104). Note that the band at the present time means a band in use. When the width of the band satisfying the error frequency occurrence condition is wider than the width of the allocated band at the present time (step S104: YES), the allocation control unit 33 transmits the wavelength allocation notification (step S105).

Next, the allocation device 4 executes the content of the wavelength allocation notification (step S106). On the other hand, when the width of the band satisfying the error frequency occurrence condition is equal to or less than the width of the allocated band at the present time (step S104: NO), the allocation control unit 33 does not transmit the wavelength allocation notification (step S107). When the wavelength allocation notification is not transmitted, the allocation device 4 does not perform the reallocation of the wavelength. Thus, the allocation control unit 33 controls the operation of the allocation device 4 according to whether or not to transmit the wavelength allocation notification and the content of the wavelength allocation notification.

Note that, in this way, since the wavelength allocation notification is transmitted or not transmitted in accordance with the judgement result of the step S104, the processing of the step S104 is processing of judging whether or not to reallocate the wavelength. Note that the wavelength allocation notification of the processing in the step S105 may be a notification of wavelength allocation including addition and deletion of wavelengths.

The content of the wavelength allocation notification is determined by the allocation destination wavelength setting unit 331. The content of the wavelength allocation notification is determined on the basis of band information calculated by the real-time analysis unit 322 by the allocation destination wavelength setting unit 331 after the step S105 is performed. For example, the allocation destination wavelength setting unit 331 judges a wavelength having a small number of active terminals as a reallocation destination. The allocation destination wavelength setting unit 331 determines the allocation device 4 of the transmission destination of the wavelength allocation notification.

Figure 4:
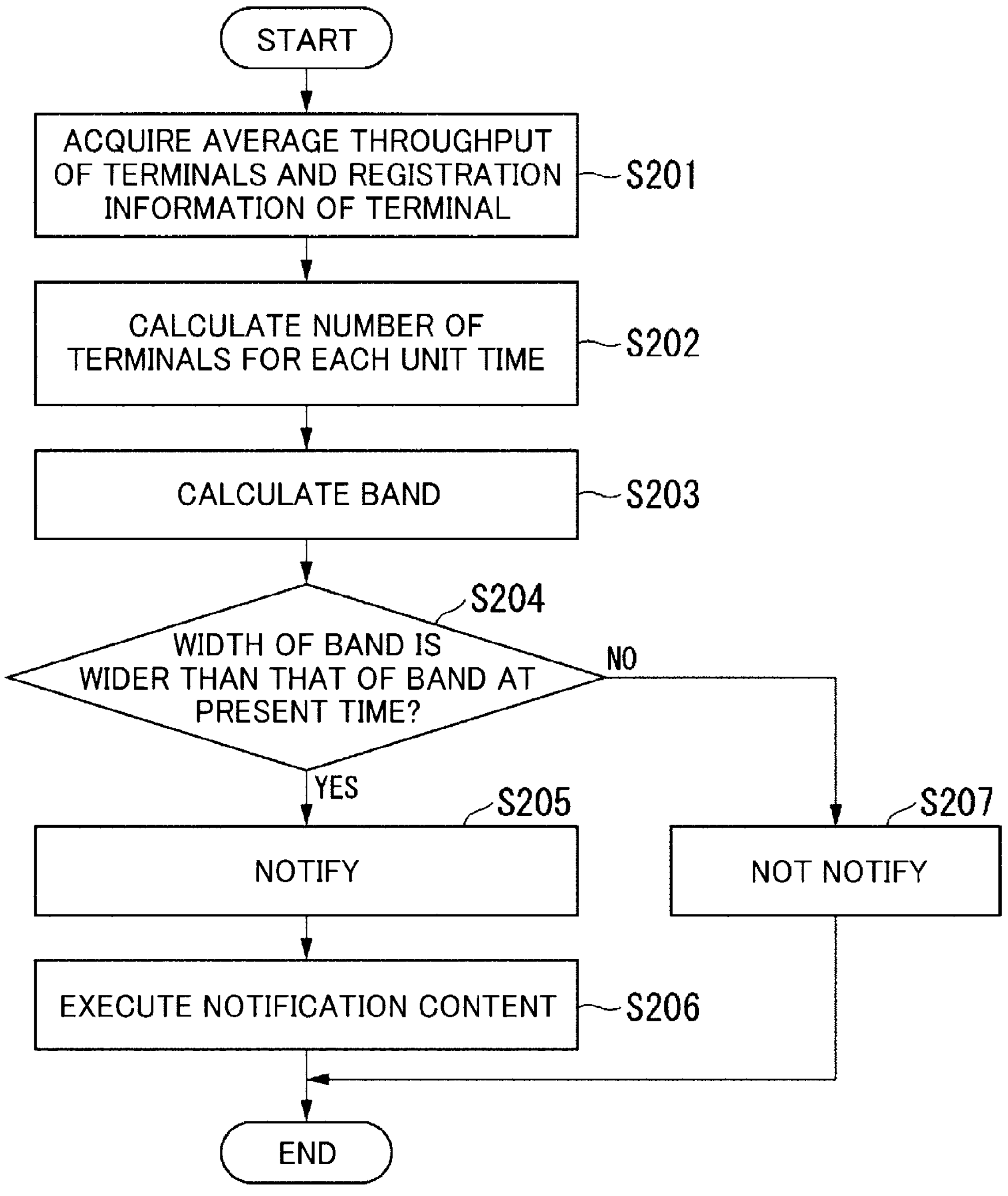
FIG. 4 is a second flowchart showing an example of the flow of processing executed by the management control device according to the embodiment.

FIG. 4 is a second flowchart showing an example of a flow of processing executed by the management control device 3 according to the embodiment. More specifically, FIG. 4 is a flowchart showing an example of a flow of processing executed by the management control device 3, as an example, in a case where the cooperation information is the average throughput of the terminals 900 (that is, a terminal average throughput) and registration information of the terminal 900.

The flow of the processing shown in FIG. 4 is not executed only when the unexpected event such as AMCC or SNMP occurs, but is repeatedly executed at the predetermined cycle.

The cooperation information reception unit 311 acquires the cooperation information from the distributed station 2 (step S201). Next, the real-time analysis unit 322 calculates the number of terminals 900 for each unit time on the basis of registration information of the terminal 900 among information included in the cooperation information (step S202). Next, the real-time analysis unit 322 calculates a band satisfying the error frequency occurrence condition on the basis of the terminal average throughput and the number of terminals 900 per unit time (step S203).

The real-time analysis unit 322 calculates, for example, a product of the terminal average throughput and the number of terminals 900 per unit time, and acquires a calculation result as the band satisfying the error frequency occurrence condition. The processing in the step S202 and the step S203 is an analysis of the communication state in the communication system 100 by the real-time analysis unit 322, and an example of analysis based on the cooperation information.

Next, the wavelength control judgement unit 323 judges whether or not width of the band satisfying the error frequency generation condition is wider than the width of the allocated band at the present time (step S204). When the width of the band satisfying the error frequency occurrence condition is wider than the width of the allocated band at the present time (step S204: YES), the allocation control unit 33 transmits the wavelength allocation notification (step S205).

Next, the allocation device 4 executes the content of the wavelength allocation notification (step S206). On the other hand, when the width of the band satisfying the error frequency occurrence condition is equal to or less than the width of the allocated band at the present time (step S204: NO), the allocation control unit 33 does not transmit the wavelength allocation notification (step S207). When the wavelength allocation notification is not transmitted, the allocation device 4 does not perform the re-allocation of the wavelength. Thus, the allocation control unit 33 controls the operation of the allocation device 4 according to whether or not to transmit the wavelength allocation notification and the content of the wavelength allocation notification.

Note that, in this way, since the wavelength allocation notification is transmitted or not transmitted in accordance with the judgement result of the step S204, the processing of the step S204 is processing for judging whether or not to reallocate the wavelength. Note that the wavelength allocation notification of the processing in the step S205 may be a notification of wavelength allocation including addition and deletion of wavelengths.

The content of the wavelength allocation notification is determined, for example, by the wavelength control judgement unit 323 of the analysis unit 32. The content of the wavelength allocation notification may be determined by the allocation destination wavelength setting unit 331. The content of the wavelength allocation notification is determined on the basis of band information calculated by the real-time analysis unit 322 by the allocation destination wavelength setting unit 331 after the step S205 is performed. For example, the allocation destination wavelength setting unit 331 judges a wavelength having a small number of terminals per unit time as a reallocation destination. The allocation destination wavelength setting unit 331 determines the allocation device 4 of the transmission destination of the wavelength allocation notification.

Figure 5:
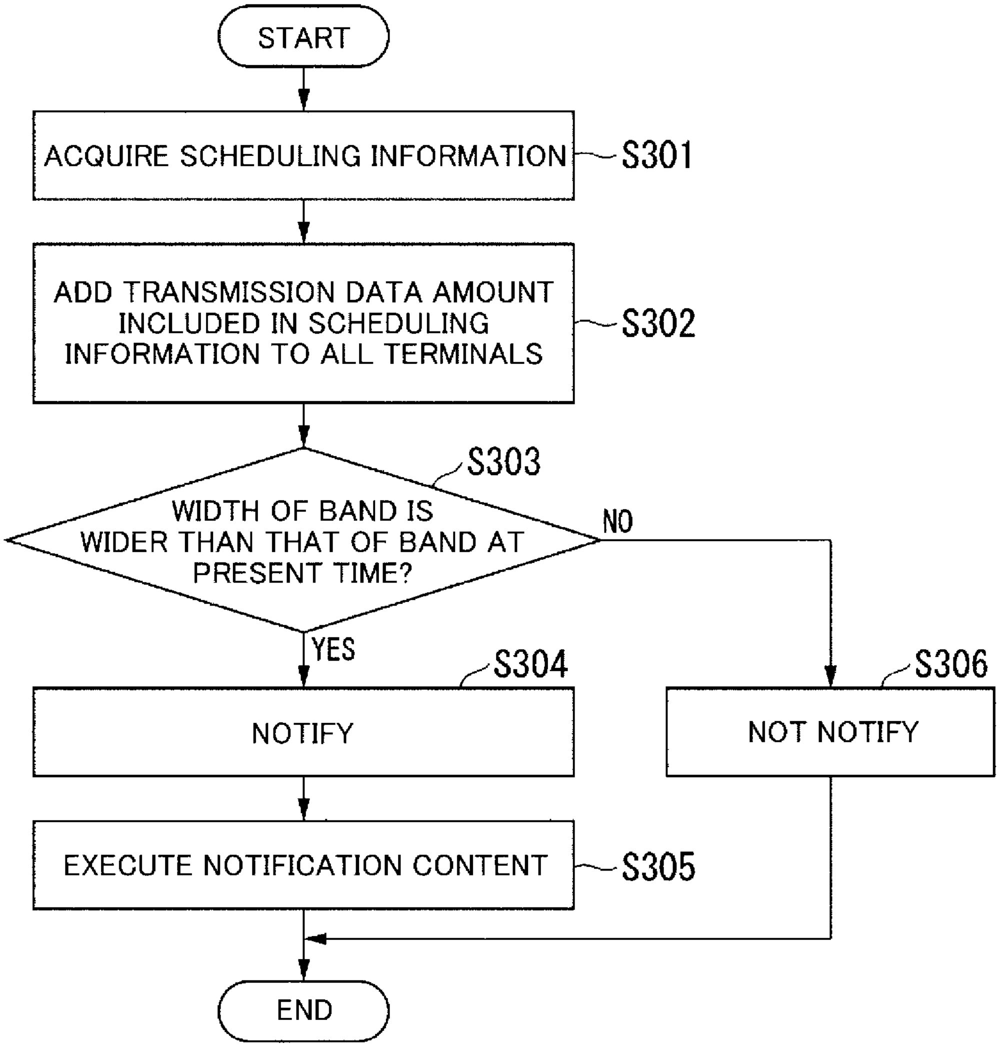
FIG. 5 is a third flowchart showing an example of the flow of processing executed by the management control device according to the embodiment.

FIG. 5 is a third flowchart showing an example of a flow of processing executed by the management control device 3 according to the embodiment. More specifically, FIG. 5 is a flow chart showing an example of a flow of processing executed by the management control device 3, as an example, in a case where the cooperation information is scheduling information.

The flow of the processing shown in FIG. 5 is not executed only when the unexpected event such as AMCC or SNMP occurs, but is repeatedly executed at the predetermined cycle.

The cooperation information reception unit 311 acquires the cooperation information from the distributed station 2 (step S301). Next, the real-time analysis unit 322 adds the traffic amount of each terminal 900 included in the cooperation information to all the terminals 900 (step S302). That is, in the step S302, the real-time analysis unit 322 adds the transmission data amount of each scheduling information, and acquires a calculation result as the band satisfying the error frequency generation condition.

The processing in the step S302 is an analysis of the communication state in the communication system 100 by the real-time analysis unit 322, and an example of analysis based on the cooperation information.

Next, the wavelength control judgement unit 323 judges whether or not the width of the band satisfying the error frequency generation condition is wider than the width of an allocated band at the present time (step S303). When the width of the band satisfying the error frequency occurrence condition is wider than the width of the allocated band at the present time (step S303: YES), the allocation control unit 33 transmits the wavelength allocation notification (step S304).

Next, the allocation device 4 executes the content of the wavelength allocation notification (step S305). On the other hand, when the width of the band satisfying the error frequency occurrence condition is equal to or less than the width of the allocated band at the present time (step S303: NO), the allocation control unit 33 does not transmit the wavelength allocation notification (step S306). When the wavelength allocation notification is not transmitted, the allocation device 4 does not perform the reallocation of the wavelength. Thus, the allocation control unit 33 controls the operation of the allocation device 4 according to whether or not to transmit the wavelength allocation notification and the content of the wavelength allocation notification.

Note that, in this way, since the wavelength allocation notification is transmitted or not transmitted in accordance with the judgement result of the step S303, the processing of the step S303 is processing for judging whether or not to reallocate the wavelength. Note that the wavelength allocation notification of the processing in the step S304 may be a notification of wavelength allocation including addition and deletion of wavelengths.

The content of the wavelength allocation notification is determined, for example, by the wavelength control judgement unit 323 of the analysis unit 32. The content of the wavelength allocation notification may be determined by the allocation destination wavelength setting unit 331. The content of the wavelength allocation notification is determined based on the band information calculated by the real-time analysis unit 322 by the allocation destination wavelength setting unit 331 after the step S304 is performed. For example, the allocation destination wavelength setting unit 331 judges a wavelength in which a current band is larger than a required band as a reallocation destination. The allocation destination wavelength setting unit 331 determines the allocation device 4 of the transmission destination of the wavelength allocation notification.

Figure 6:
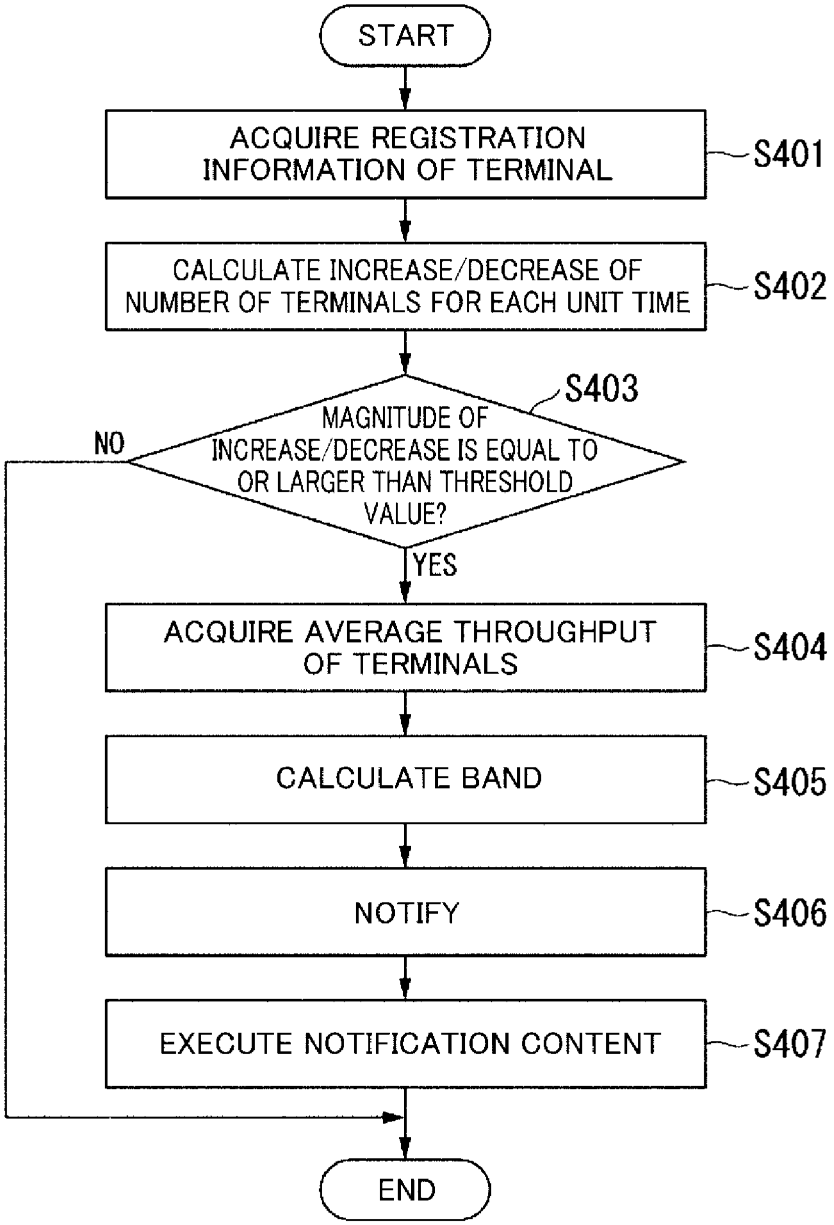
FIG. 6 is a fourth flowchart showing an example of the flow of processing executed by the management control device according to the embodiment.

FIG. 6 is a fourth flowchart showing an example of a flow of processing executed by the management control device 3 according to the embodiment. More specifically, FIG. 6 is a flow chart showing an example of a flow of processing executed by the management control device 3, as an example, in a case where one piece of the cooperation information is registration information of the terminal 900.

The flow of the processing shown in FIG. 6 is not executed only when the unexpected event such as AMCC or SNMP occurs, but is repeatedly executed at the predetermined cycle.

The cooperation information reception unit 311 acquires the registration information of the terminal 900 from the distributed station 2 (step S401). Next, the real-time analysis unit 322 calculates the increase/decrease of the number of terminals 900 for each unit time on the basis of the registration information of the terminal 900 (step S402). Next, the wavelength control judgement unit 323 judges whether or not the magnitude of the increase/decrease obtained in the step S402 is equal to or larger than a preset predetermined threshold value (step S403).

When the magnitude of the increase/decrease is not equal to or larger than the threshold value (step S403: NO), the processing is terminated. On the other hand, when the magnitude of the increase/decrease is equal to or larger than the threshold value (step S403: YES), the cooperation information reception unit 311 acquires the average throughput (that is, terminal average throughput) of the terminals 900 from the distributed station 2 (step S404). Next, the real-time analysis unit 322 calculates the band satisfying the error frequency occurrence condition on the basis of the terminal average throughput and the number of terminals 900 per unit time (step S405).

The real-time analysis unit 322 calculates, for example, a product of the terminal average throughput and the number of terminals 900 per unit time, and acquires a calculation result as the band satisfying the error frequency occurrence condition. The processing of the step S402 and the step S405 is an analysis of the communication state in the communication system 100 by the real-time analysis unit 322, and an example of analysis based on the cooperation information.

Next, the allocation control unit 33 transmits the wavelength allocation notification (step S406). Next, the allocation device 4 executes the content of the wavelength allocation notification (step S407).

Note that when the magnitude of the increase/decrease is not judged to be equal to or larger than the threshold value in the step S403 as shown by the flow of the processing in FIG. 6, the wavelength allocation notification is not transmitted. That is, when the magnitude of the increase/decrease is not judged to be equal to or larger than the threshold value in the step S403, the allocation control unit 33 does not transmit the wavelength allocation notification. In this way, the allocation control unit 33 controls the operation of the allocation device 4 according to whether or not to transmit the wavelength allocation notification and the content of the wavelength allocation notification.

Note that, in this way, since the wavelength allocation notification is transmitted or not transmitted in accordance with the judgement result of the step S403, the processing of the step S403 is processing for judging whether or not to reallocate the wavelength. Note that the wavelength allocation notification of the processing in the step S406 may be a notification of wavelength allocation including addition and deletion of wavelengths.

The content of the wavelength allocation notification is determined, for example, by the wavelength control judgement unit 323 of the analysis unit 32. The content of the wavelength allocation notification may be determined by the allocation destination wavelength setting unit 331. The content of the wavelength allocation notification is determined based on the band information calculated by the real-time analysis unit 322 by the allocation destination wavelength setting unit 331 after the step S406 is performed. For example, the allocation destination wavelength setting unit 331 determines a wavelength having a large reduction in the number of terminals per unit time as a reallocation destination. The allocation destination wavelength setting unit 331 determines the allocation device 4 of the transmission destination of the wavelength allocation notification.

As shown in FIG. 3 to FIG. 6, the wavelength control judgement unit 323 judges whether or not to execute the wavelength allocation on the basis of the cooperation information. More specifically, the wavelength control judgement unit 323 judges whether or not to execute the wavelength allocation on the basis of a result of analysis based on the cooperation information, which is the analysis of the communication state in the communication system 100 by the real-time analysis unit 322. Then, as shown in FIG. 3 to FIG. 6, the allocation control unit 33 controls execution of the wavelength allocation by the allocation device 4 according to whether or not to transmit the wavelength allocation notification and the content of the wavelength allocation notification.

Figure 7:
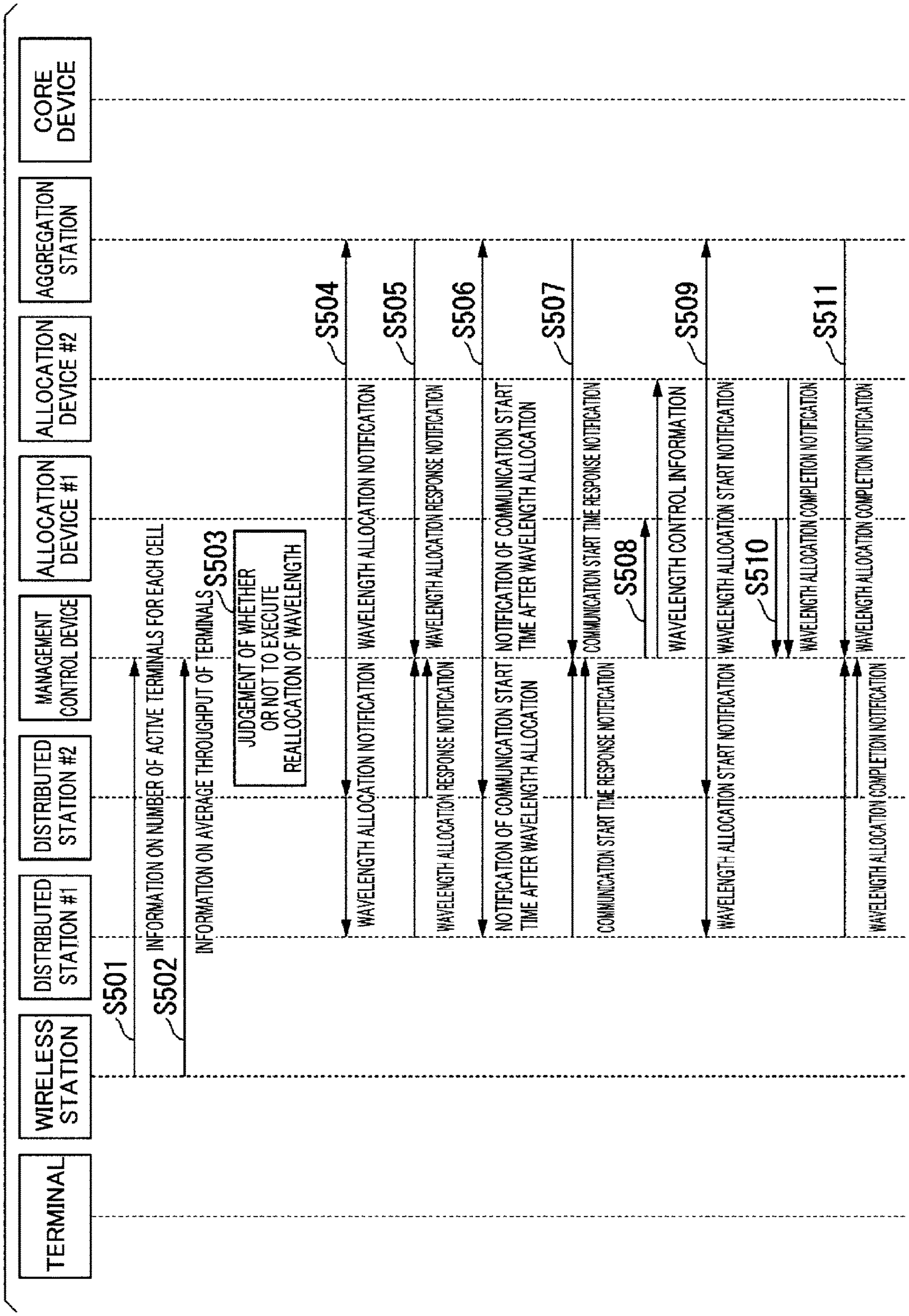
FIG. 7 is a sequence diagram showing an example of a flow of processing executed by the communication system of the embodiment.

FIG. 7 is a sequence diagram showing an example of a flow of processing executed by the communication system 100 of the embodiment. More specifically, FIG. 7 is a sequence diagram showing an example of a flow of processing executed by the communication system 100, as an example, in a case where the cooperation information indicates the average throughput of the terminals 900 and the number of active terminals 900 for each cell.

In addition, FIG. 7 shows an example of a flow of processing executed by the communication system 100, as an example, in a case where the result of the judgement as to whether or not to execute the wavelength allocation by the wavelength control judgement unit 323 is a result of executing the wavelength allocation.

"Distributed station #1" means one of the distributed stations 2 provided in the communication system 100, and "distributed station #2" is one of the distributed stations provided in the communication system 100 and means another distributed station 2 which is different from "distributed station #1".

"Allocation device #1" is the allocation device 4 corresponding to "distributed station #1". "Allocation device #2" is the allocation device 4 corresponding to "distributed station #2".

Information indicating the number of active terminals 900 for each cell is transmitted from the wireless station 1 to the management control device 3 (step S501). Next, information indicating the average throughput of the terminals 900 is transmitted from the wireless station 1 to the management control device 3 (step S502). For the processing of step S501 and the processing of step S502, any one may be executed before the other one.

Next, the wavelength control judgement unit 323 judges whether or not to execute the wavelength allocation on the basis of the cooperation information obtained in the step S501 and the step S502 (step S503). Next, the allocation control unit 33 transmits the wavelength allocation notification to the distributed station #1, the distributed station #2 and the aggregation station 5 (step S504).

Next, the distributed station #1, the distributed station #2 and the aggregation station 5 transmit a wavelength allocation response notification to the allocation control unit 33 (step S505). The wavelength allocation response notification is information indicating that the wavelength allocation notification has been received.

Next, the allocation control unit 33 notifies the distributed station #1, the distributed station #2 and the aggregation station 5 of the start time of communication after the wavelength allocation (step S506). Next, the distributed station #1, the distributed station #2 and the aggregation station 5 return a response to the notification of the start time of communication after the wavelength allocation to the allocation control unit 33 (step S507).

Next, the allocation control unit 33 transmits wavelength control information to each allocation device 4 of "allocation device #1" and "allocation device #2" (step S508). The wavelength control information is an instruction to allocate a wavelength. The wavelength control information is an example of control information. Next, the allocation control unit 33 notifies the distributed station #1, the distributed station #2 and the aggregation station 5 of the start of wavelength allocation (step S509). Next, each allocation device 4 of "allocation device #1" and "allocation device #2" notifies the allocation control unit 33 of completion of the wavelength allocation (step S510). Next, the distributed station #1, the distributed station #2 and the aggregation station 5 notify the allocation control unit 33 of the completion of the wavelength allocation (step S511).

Note that it is not always necessary to execute processing of step S505. In this way, even when there is no response after the allocation control unit 33 transmits the wavelength allocation notification, processing after the step S506 is executed. Note that the processing of step S508 may be executed before the processing of step S507.

The communication system 100 of the embodiment constituted in this way repeatedly executes the wavelength allocation control not only when the unexpected event such as AMCC and SNMP occurs, but also at the predetermined cycle. Therefore, in the communication system 100, it is possible to suppress a frequency of communication error occurrence.

Further, in the communication system 100 of the embodiment constituted in this way, the management control device 3 directly acquires the cooperation information from the distributed station 2 and executes the control of wavelength allocation. As a result, the communication system 100 can perform the wavelength allocation control with less time loss compared to a case where the cooperation information is transferred from the distributed station 2 to a transfer destination such as the core device 6 and then transferred from the transfer destination to the management control device 3, for example. Therefore, in the communication system 100, it is possible to suppress the frequency of communication error occurrence.

First Modified Example

In the communication system 100 of the embodiment, the management control device 3 notifies the distributed station 2 and the aggregation station 5 as shown in the flowchart of FIG. 7. However, it is not always necessary to transmit the notification from the management control device 3 to the distributed station 2 and the aggregation station 5. The notification may be transmitted from the allocation device 4 to the distributed station 2 and the aggregation station 5, for example. An example of sequence diagram for such a case is shown in FIG. 8.

Figure 8:
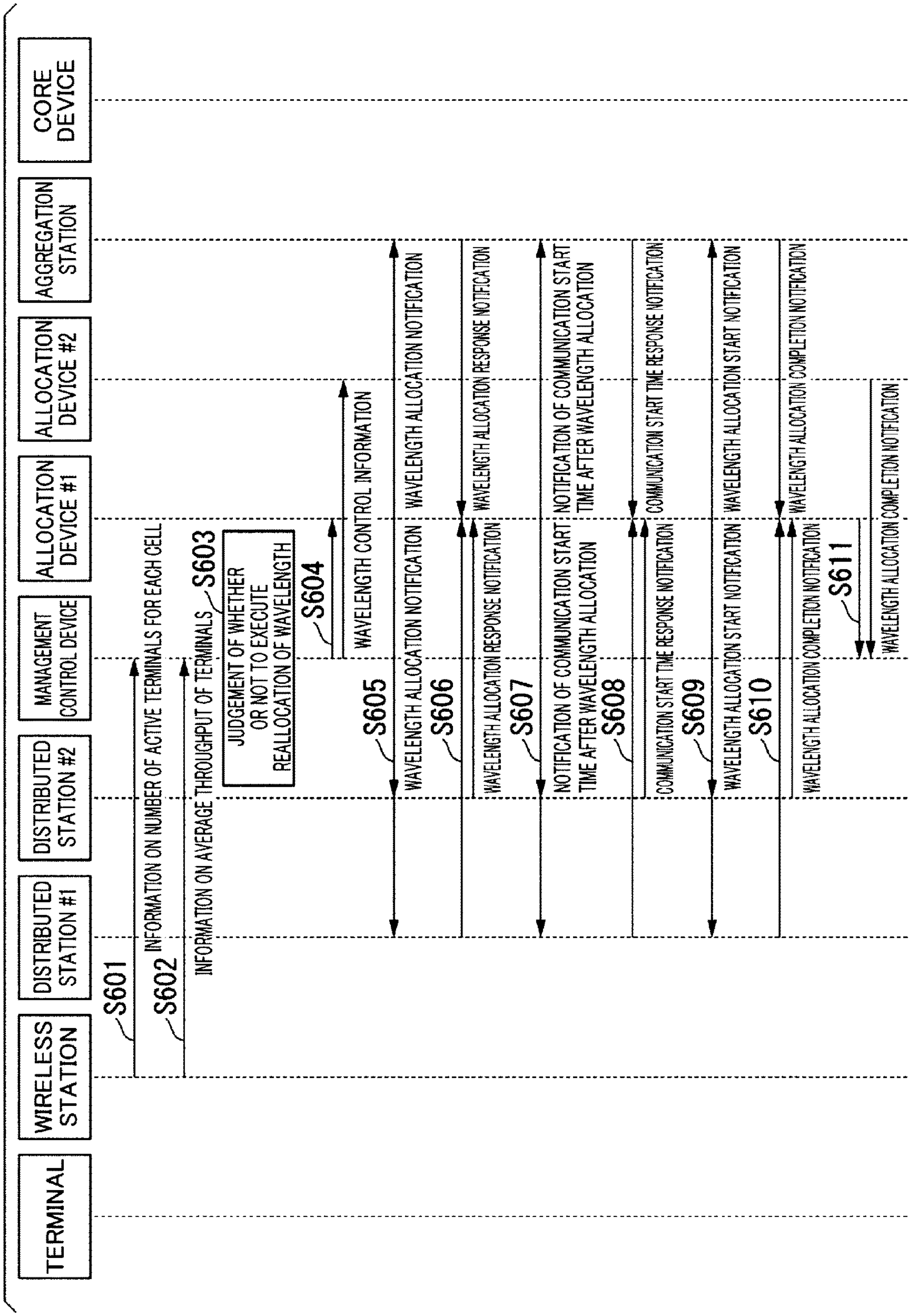
FIG. 8 is a sequence diagram showing an example of a flow of processing executed by a communication system of a modified example.

FIG. 8 is a sequence diagram showing an example of a flow of processing executed by the communication system 100 of the modified example. More specifically, FIG. 8 is a sequence diagram showing an example of a flow of processing executed by the communication system 100 of the modified example, as an example, in a case where the cooperation information indicates the average throughput of the terminals 900 and the number of active terminals 900 for each cell.

In addition, FIG. 8 shows an example of a flow of processing executed by the communication system 100 of the modified example, as an example, in a case where the result of the judgement as to whether or not to execute the wavelength allocation by the wavelength control judgement unit 323 is a result of executing the wavelength allocation.

"Distributed station #1" means one of the distributed stations 2 provided in the communication system 100, and "distributed station #2" is one of the distributed stations provided in the communication system 100 and means another distributed station 2 which is different from "distributed station #1". "Allocation device #1" is the allocation device 4 corresponding to "distributed station #1". "Allocation device #2" is the allocation device 4 corresponding to "distributed station #2".

Information indicating the number of active terminals 900 for each cell is transmitted from the wireless station 1 to the management control device 3 (step S601). Next, information indicating the average throughput of the terminals 900 is transmitted from the wireless station 1 to the management control device 3 (step S602). For the processing of step S601 and the processing of step S602, any one may be executed before the other one.

Next, the wavelength control judgement unit 323 judges whether or not to execute the wavelength allocation on the basis of the cooperation information obtained in the step S601 and the step S602 (step S603). Next, the allocation control unit 33 transmits the wavelength control information to each allocation device 4 of "allocation device #1" and "allocation device #2" (step S604).

Next, each allocation device 4 of "allocation device #1" and "allocation device #2" transmits the wavelength allocation notification to the distributed station #1, the distributed station #2 and the aggregation station 5 (step S605). Next, the distributed station #1, the distributed station #2 and the aggregation station 5 transmit the wavelength allocation response notification to each allocation device 4 of "allocation device #1" and "allocation device #2" (step S606).

Next, each allocation device 4 of "allocation device #1" and "allocation device #2" notifies the distributed station #1, the distributed station #2 and the aggregation station 5 of the start time of communication after the wavelength allocation (step S607). Next, the distributed station #1, the distributed station #2 and the aggregation station 5 return the response to the notification of the start time of communication after the wavelength allocation to each allocation device 4 of "allocation device #1" and "allocation device #2" (step S608).

Next, each allocation device 4 of "allocation device #1" and "allocation device #2" notifies the start of wavelength allocation to the distributed station #1, the distributed station #2 and the aggregation station 5 (step S609). Next, the distributed station #1, the distributed station #2 and the aggregation station 5 notify each allocation device 4 of "allocation device #1" and "allocation device #2" of the completion of the wavelength allocation (step S610). Next, each allocation device 4 "allocation device #1" and "allocation device #2" notifies the allocation control unit 33 of the completion of the wavelength allocation (step S611).

Second Modified Example

Note that a part or all of the respective functional units provided in the management control device 3 may be provided in the distributed station 2. For example, the collection unit 31 and the analysis unit 32 may be provided in the distributed station 2 in place of the management control device 3.

Third Modified Example

Note that, in the allocation device 4, it is not always necessary that each allocation device 4 exists in each of the distributed stations 2, and one allocation device 4 may be provided for each of the plurality of distributed stations 2.

Figure 9:
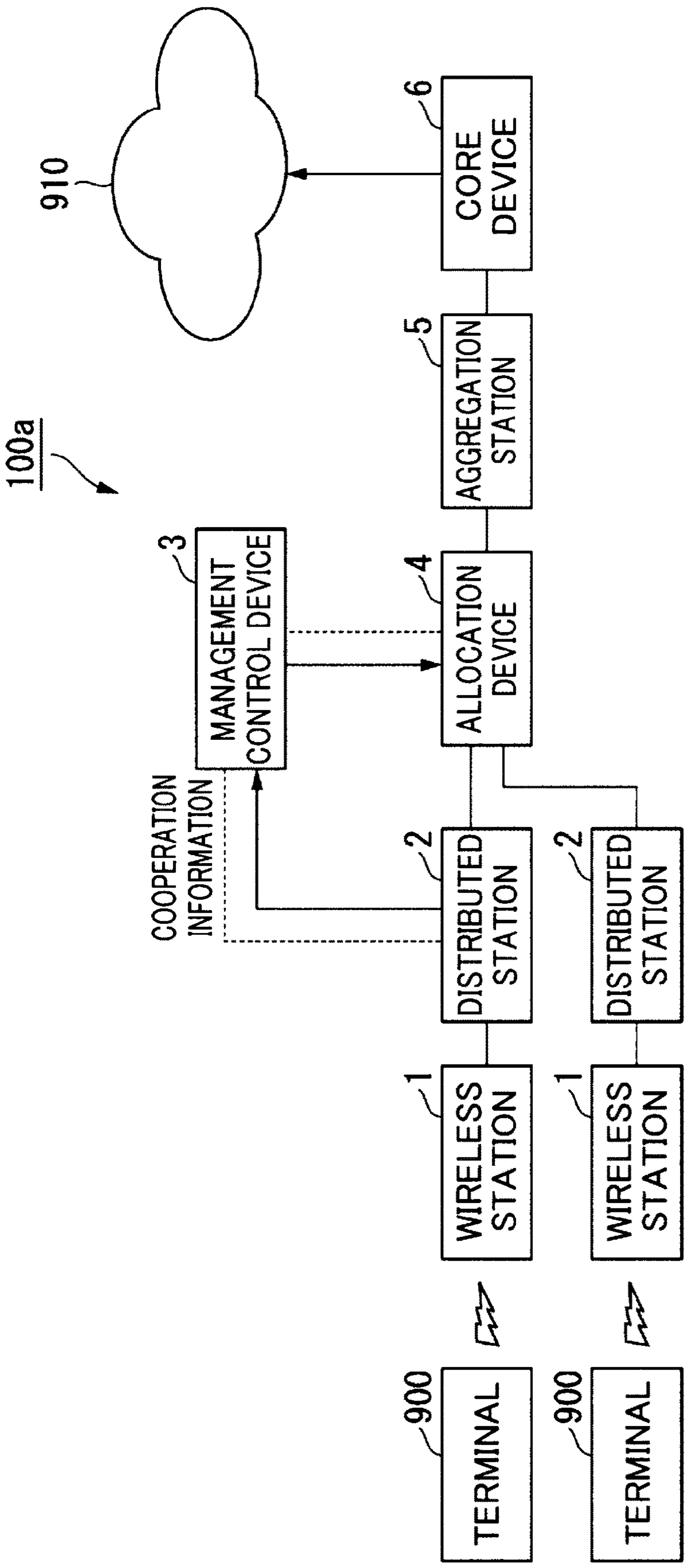
FIG. 9 is a diagram showing an example of a configuration of a communication system according to a third modified example.

FIG. 9 is a diagram showing an example of a configuration of the communication system 100*a* according to the third modified example. Hereinafter, for the sake of simplicity of description, functional units having the same functions as those included in the communication system 100 are denoted by the same reference numerals as those in FIG. 1, and description thereof is omitted. The communication system 100*a* is different from the communication system 100 in that the distributed station 2 and the allocation device 4 do not have a one-to-one relationship but have an N-to-one relationship (N is an integer of 2 or more). The relationship between the allocation device 4 and the aggregation station 5 in the communication system 100*a* is different from the communication system 100 and has a one-to-one relationship. Therefore, in the communication system 100*a*, the relationship between the allocation device 4 and the aggregation station 5 is not changed regardless of the content of wavelength allocation.

Figure 10:
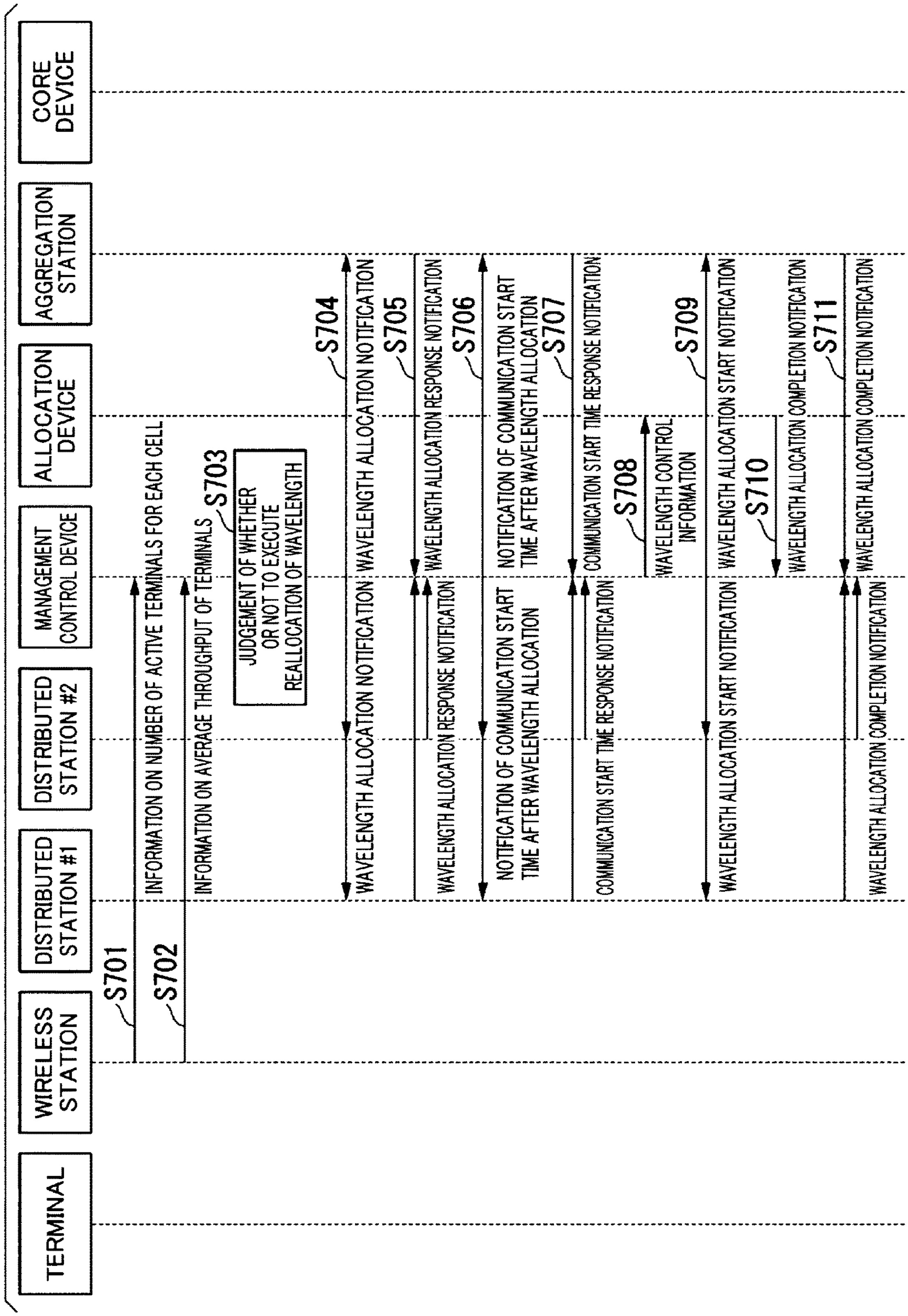
FIG. 10 is a first sequence diagram showing an example of a flow of processing executed by the communication system of the third modified embodiment.

FIG. 10 is a first sequence diagram showing an example of a flow of processing executed by the communication system 100*a* of the third modified example. More specifically, FIG. 10 is a sequence diagram showing an example of a flow of processing executed by the communication system 100*a*, as an example, in a case where the cooperation information indicates the average throughput of the terminals 900 and the number of active terminals 900 for each cell.

In addition, FIG. 10 shows an example of a flow of processing executed by the communication system 100*a*, as an example, in a case where the result of the judgement as to whether or not to execute the wavelength allocation by the wavelength control judgement unit 323 is a result of executing the wavelength allocation.

"Distributed station #1" means one of the distributed stations 2 provided in the communication system 100*a*, and "distributed station #2" is one of the distributed stations provided in the communication system 100*a* and means another distributed station 2 which is different from "distributed station #1".

Information indicating the number of active terminals 900 for each cell is transmitted from the wireless station 1 to the management control device 3 (step S701). Next, information indicating the average throughput of the terminals 900 is transmitted from the wireless station 1 to the management control device 3 (step S702). For the processing of step S701 and the processing of step S702, any one may be executed before the other one.

Next, the wavelength control judgement unit 323 judges whether or not to execute the wavelength allocation on the basis of the cooperation information obtained in the step S701 and the step S702 (step S703). Next, the allocation control unit 33 transmits the wavelength allocation notification to the distributed station #1, the distributed station #2 and the aggregation station 5 (step S704).

Next, the distributed station #1, the distributed station #2 and the aggregation station 5 transmit the wavelength allocation response notification to the allocation control unit 33 (step S705). The wavelength allocation response notification is information indicating that the wavelength allocation notification has been received.

Next, the allocation control unit 33 notifies the distributed station #1, the distributed station #2 and the aggregation station 5 of the start time of communication after the wavelength allocation (step S706). Next, the distributed station #1, the distributed station #2 and the aggregation station 5 return the response to the notification of the start time of communication after the wavelength allocation to the allocation control unit 33 (step S707).

Next, the allocation control unit 33 transmits the wavelength control information to the allocation device 4 (step S708). Next, the allocation control unit 33 notifies the distributed station #1, the distributed station #2 and the aggregation station 5 of the start of wavelength allocation (step S709). Next, the allocation device 4 notifies the allocation control unit 33 of the completion of the wavelength allocation (step S710). Next, the distributed station #1, the distributed station #2 and the aggregation station 5 notify the allocation control unit 33 of the completion of the wavelength allocation (step S711).

Note that it is not always necessary to execute processing of step S705. In this way, even when there is no response after the allocation control unit 33 transmits the wavelength allocation notification, processing after the step S706 is executed. Note that the processing of step S708 may be executed before the processing of step S707.

Figure 11:
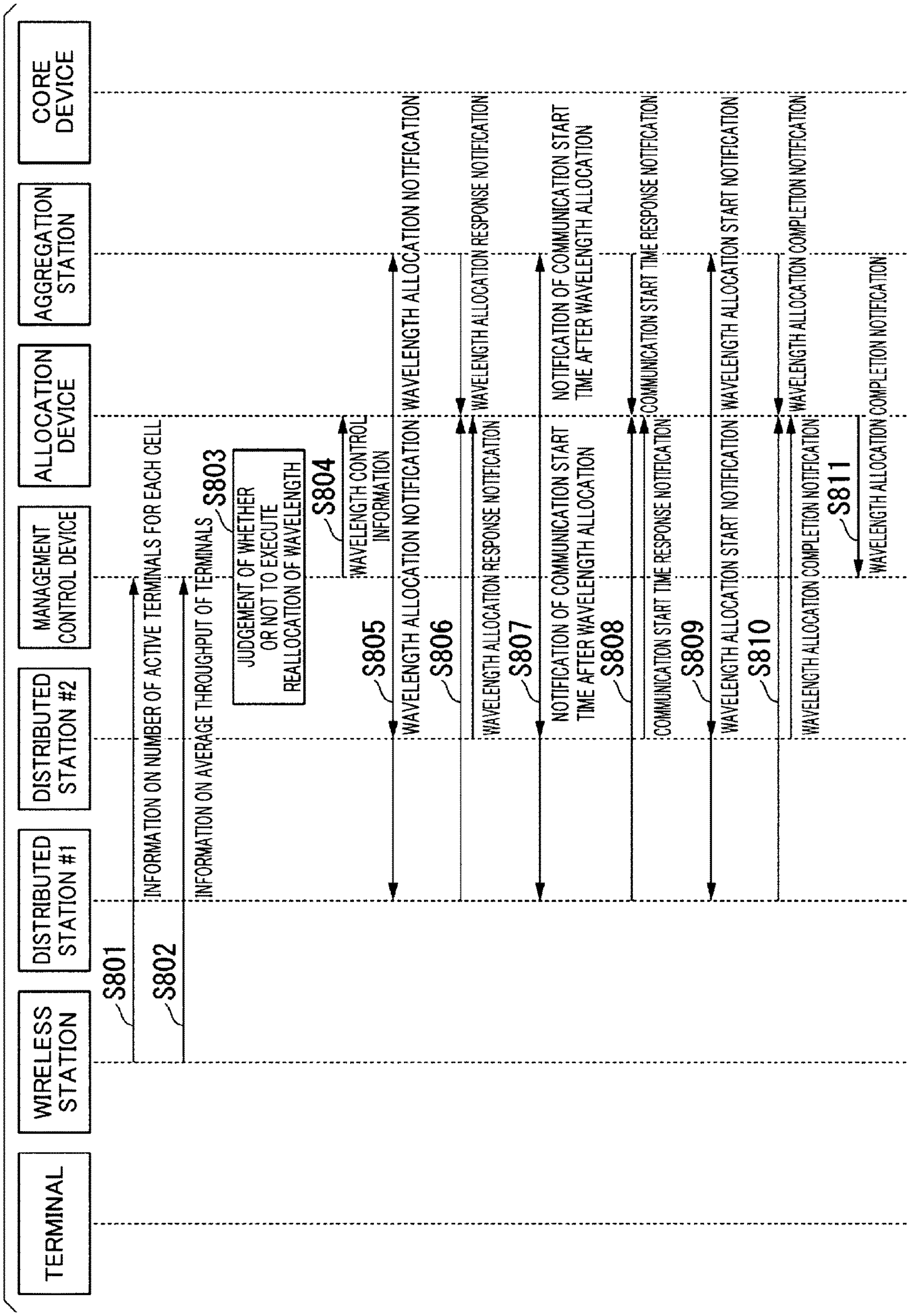
FIG. 11 is a second sequence diagram showing an example of a flow of processing executed by the communication system of the third modified embodiment.

In a flowchart of FIG. 10, the management control device 3 notifies the distributed station 2 and the aggregation station 5. However, it is not always necessary to transmit the notification from the management control device 3 to the distributed station 2 and the aggregation station 5. The notification may be transmitted from the allocation device 4 to the distributed station 2 and the aggregation station 5, for example. FIG. 11 shows a second sequence diagram showing an example of a flow of processing executed by the communication system 100*a* of such a case.

FIG. 11 is a second sequence diagram showing an example of a flow of processing executed by the communication system 100*a* of the third modified example. More specifically, FIG. 11 is a sequence diagram showing an example of a flow of processing executed by the communication system 100*a*, as an example, in a case where the cooperation information indicates the average throughput of the terminals 900 and the number of active terminals 900 for each cell.

In addition, FIG. 11 shows an example of a flow of processing executed by the communication system 100*a*, as an example, in a case where the result of the judgement as to whether or not to execute the wavelength allocation by the wavelength control judgement unit 323 is a result of executing the wavelength allocation.

Information indicating the number of active terminals 900 for each cell is transmitted from the wireless station 1 to the management control device 3 (step S801). Next, information indicating the average throughput of the terminals 900 is transmitted from the wireless station 1 to the management control device 3 (step S802). For the processing of step S801 and the processing of step S802, any one may be executed before the other one.

Next, the wavelength control judgement unit 323 judges whether or not to execute the wavelength allocation on the basis of the cooperation information obtained in the step S801 and the step S802 (step S803). Next, the allocation control unit 33 transmits the wavelength control information to the allocation device 4 (step S804).

Next, the allocation device 4 transmits the wavelength allocation notification to the distributed station #1, the distributed station #2 and the aggregation station 5 (step S805). Next, the distributed station #1, the distributed station #2 and the aggregation station 5 transmit the wavelength allocation response notification to the allocation device 4 (step S806).

Next, the allocation device 4 notifies the distributed station #1, the distributed station #2 and the aggregation station 5 of the start time of communication after the wavelength allocation (step S807). Next, the distributed station #1, the distributed station #2 and the aggregation station 5 return the response to the notification of the start time of communication after the wavelength allocation to the allocation device 4 (step S808).

Next, the allocation device 4 notifies the distributed station #1, the distributed station #2 and the aggregation station 5 of the start of wavelength allocation (step S809). Next, the distributed station #1, the distributed station #2 and the aggregation station 5 notify the allocation device 4 of the completion of the wavelength allocation (step S810). Next, the allocation device 4 notifies the allocation control unit 33 of the completion of the wavelength allocation (step S811).

(Hardware Configuration Example)

Figure 12:
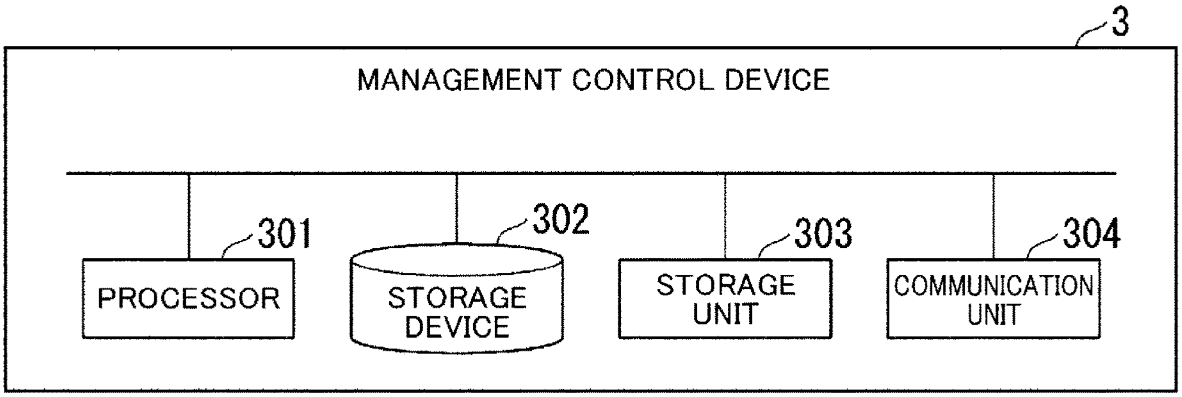
FIG. 12 is a diagram showing a hardware configuration example of the management control device according to each embodiment and modified example.

FIG. 12 is a diagram showing a hardware configuration example of the management control device 3 according to each embodiment and each modified example. A part or all of each functional unit of the management control device 3 are realized as software by causing a processor 301 such as a CPU (Central Processing Unit) to execute a program stored in a storage device 302 and a storage unit 303 including a non-volatile recording medium (non-transitory recording medium). The program may be recorded in the non-transitory recording medium that is computer-readable. Examples of the non-transitory recording medium that is computer-readable include a portable medium such as a flexible disc, a magneto-optical disc, a ROM (Read Only Memory), or a CD-ROM (Compact Disc Read Only Memory), and a non-transitory recording medium such as a storage device including a hard disk incorporated in a computer system. A communication unit 304 executes predetermined communication processing. The communication unit 304 may acquire data and a program.

A part or all of each functional unit of the management control device 3 may be realized using hardware including an electronic circuit or circuitry in which an LSI (Large Scale Integrated circuit), an ASIC (Application Specific Integrated Circuit), a PLD (Programmable Logic Device), an FPGA (Field Programmable Gate Array), or the like is used.

Figure 13:
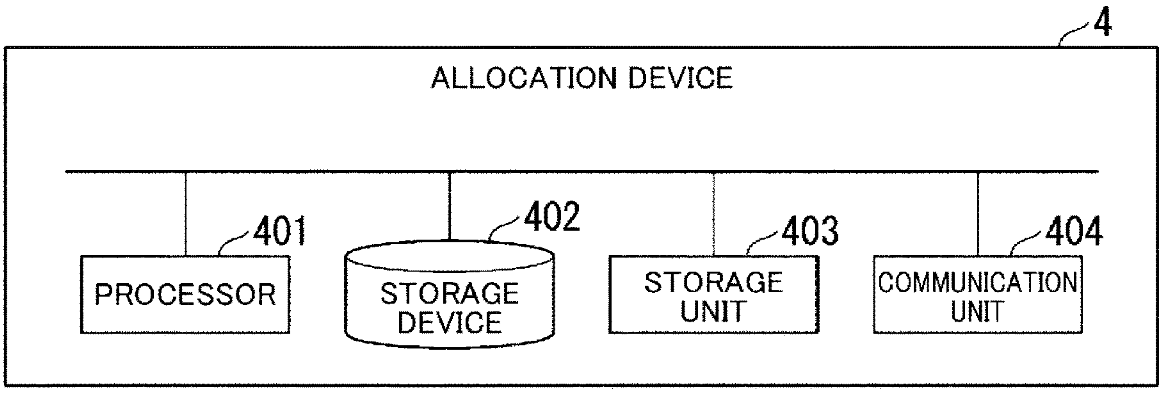
FIG. 13 is a diagram showing a hardware configuration example of an allocation device according to each embodiment and modified example.

FIG. 13 is a diagram showing a hardware configuration example of the allocation device 4 according to each embodiment and each modified example. A part or all of each functional unit of the allocation device 4 are realized as software by causing a processor 401 such as the CPU to execute the program stored in a storage device 402 and a storage unit 403 including the non-volatile recording medium (non-transitory recording medium). The program may be recorded in the non-transitory recording medium that is computer-readable. Examples of the non-transitory recording medium that is computer-readable include the portable medium such as the flexible disc, the magneto-optical disc, the ROM, or the CD-ROM, and the non-transitory recording medium such as the storage device including the hard disk incorporated in the computer system. The communication unit 404 executes the predetermined communication processing. The communication unit 404 may acquire the data and the program.

A part or all of each functional units of the allocation device 4 may be realized using hardware including an electronic circuit or circuitry in which the LSI, the ASIC, the PLD, the FPGA, or the like is used.

Figure 14:
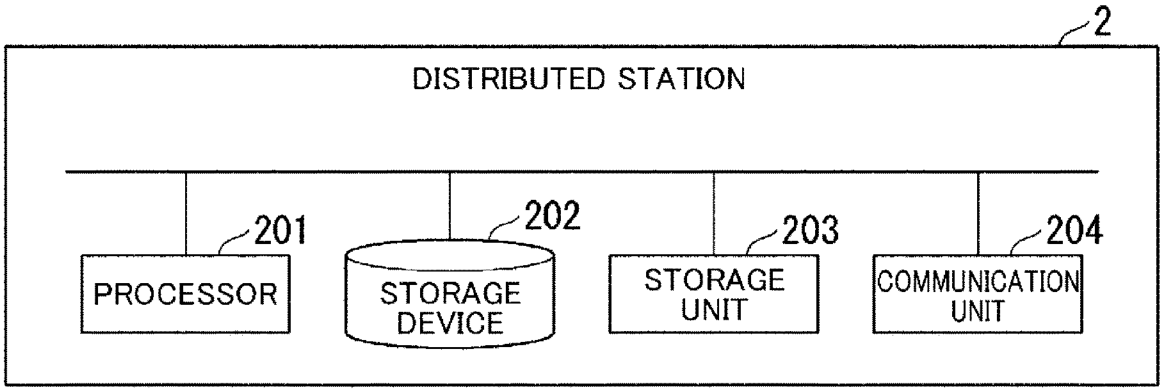
FIG. 14 is a diagram showing a hardware configuration example of a distributed station according to each embodiment and modified example.

FIG. 14 is a diagram showing a hardware configuration example of the distributed station 2 according to each embodiment and each modified example. A part or all of each functional unit of the distributed station 2 are realized as software by causing a processor 201 such as the CPU to execute a program stored in a storage device 202 or a storage unit 203 including the nonvolatile recording medium (non-transitory recording medium). The program may be recorded in the non-transitory recording medium that is computer-readable. Examples of the non-transitory recording medium that is computer-readable include the portable medium such as the flexible disc, the magneto-optical disc, the ROM, or the CD-ROM, and the non-transitory recording medium such as the storage device including the hard disk incorporated in the computer system. A communication unit 204 executes the predetermined communication processing. The communication unit 204 may acquire the data and the program.

A part or all of each functional unit of the distributed station 2 may be realized using hardware including the electronic circuit or circuitry in which the LSI, the ASIC, the PLD, the FPGA, or the like is used.

Each of the distributed station 2, the management control device 3 and the allocation device 4 may be implemented by using a plurality of information processing devices communicatively connected via a network. In this case, each functional unit included in each of the distributed station 2, the management control device 3 and the allocation device 4 may be distributed and implemented in the plurality of information processing devices.

Each embodiment may be combined.

Although the above embodiment of the present invention has been described in detail with reference to the drawings, a specific configuration is not limited to these embodiments, and design within the scope of the gist of the present invention, and the like are included.

INDUSTRIAL APPLICABILITY

The present invention is applicable to optical communication systems such as optical access systems.

REFERENCE SIGNS LIST

100 Communication system
1 Wireless station
2 Distributed station
3 Management control device
4 Allocation device
5 Aggregation station
6 Core device
31 Collection unit
32 Analysis unit
33 Allocation control unit
311 Cooperation information reception unit
321 Cooperation information accumulation unit
322 Real-time analysis unit
323 Wavelength control judgement unit
331 Allocation destination wavelength setting unit
332 Wavelength control signal generation unit
201 Processor
202 Storage device
203 Storage unit
204 Communication unit
301 Processor
302 Storage device
303 Storage unit
304 Communication unit
401 Processor
402 Storage device
403 Storage unit
404 Communication unit
900 Terminal
910 Network

The invention claimed is:

1. A control device comprising:
a processor; and
a storage medium having computer program instructions stored thereon, wherein the computer program instruction, when executed by the processor, perform processing of:
acquiring, at a predetermined cycle, cooperation information, which is information indicating a communication state between a communication system that includes a wireless station including an antenna and an allocation device that allocates a wavelength, and a terminal to be communicated;
analyzing the communication state in the communication system on the basis of the cooperation information; and
controlling execution of wavelength allocation by the allocation device on the basis of an analysis result of the analyzing, wherein the cooperation information is acquired from a distributed station that acquires signals transmitted by the wireless station.

2. The control device according to claim 1, wherein
the cooperation information includes an average throughput of the terminals and the number of the terminals, with which each of the wireless stations is communicating, for each of the wireless stations.

3. The control device according to claim 1, wherein
the cooperation information includes an average throughput of the terminals and registration information of the terminal.

4. The control device according to claim 1, wherein
the cooperation information includes scheduling information including a traffic amount of each terminal.

5. A non-transitory computer readable medium which stores a program for causing a computer to function as the control device according to claim 1.

6. A communication system comprising:
a wireless station including an antenna,
an allocation device that allocates a wavelength,
a processor; and a storage medium having computer program instructions stored thereon, wherein the computer program instruction, when executed by the processor, perform processing of:

acquiring, at a predetermined cycle, cooperation information, which is information indicating a communication state between the communication system and a terminal to be communicated;

analyzing the communication state in the system on the basis of the cooperation information; and controlling execution of wavelength allocation by the allocation device on the basis of an analysis result of the analyzing, wherein the cooperation information is acquired from a distributed station that acquires signals transmitted by the wireless station.

7. A control method comprising:

acquiring, at a predetermined cycle, cooperation information, which is information indicating a state of communication between a communication system that includes a wireless station including an antenna and an allocation device that allocates a wavelength, and a terminal to be communicated;

analyzing the communication state in the communication system on the basis of the cooperation information; and controlling execution of wavelength allocation by the allocation device on the basis of an analysis result of the analyzing, wherein the cooperation information is acquired from a distributed station that acquires signals transmitted by the wireless station.

* * * * *